No. 782,008. PATENTED FEB. 7, 1905.
L. DETRÉ.
APPARATUS FOR DYEING.
APPLICATION FILED NOV. 30, 1903.
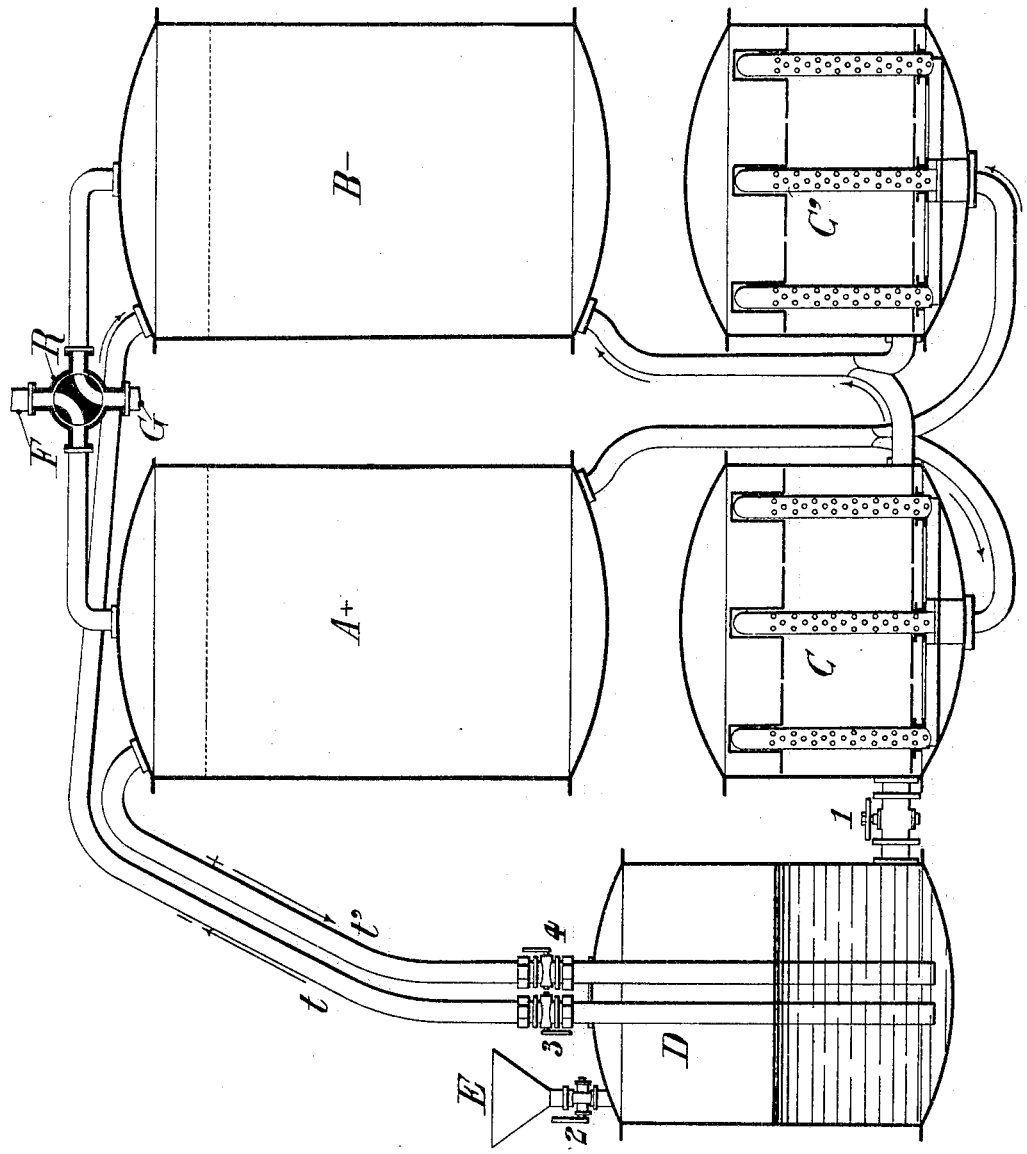

No. 782,008. Patented February 7, 1905.

UNITED STATES PATENT OFFICE.

LÉON DÉTRÉ, OF RHEIMS, FRANCE.

APPARATUS FOR DYEING.

SPECIFICATION forming part of Letters Patent No. 782,008, dated February 7, 1905.

Application filed November 30, 1903. Serial No. 183,282.

*To all whom it may concern:*

Be it known that I, LÉON DÉTRÉ, dyer, a citizen of the French Republic, residing at Rheims, Department of Marne, France, have invented certain new and useful Improvements in Connection with Apparatus for Dyeing under Pressure, of which the following is a specification.

This invention has for its object to provide in apparatus for dyeing under pressure means whereby the introduction of the dyes or mordants into the apparatus can be effected while the apparatus is at work and while the pressures remain in the various vessels composing the apparatus.

The most recent design of apparatus for dyeing under pressure is illustrated in the accompanying drawing and comprises two vessels A and B, containing the dyestuff, and another vessel or other vessels, C C', containing the articles or material to be dyed. Compressed air or any other suitable fluid pressure is admitted alternately to each of the two vessels A and B containing the dye, so as to force the dye from, say, the vessel A into the vessel C, containing the articles or materials to be dyed, and from the said vessels into the second vessel, say the vessel B. Then by means of a cock the pressure is disconnected from the vessel A and admitted to the vessel B, thereby forcing the dye from the vessel B into the vessel C and therefrom back into the vessel A. The cock for reversing the direction of the pressure is a four-way cock R, which is worked automatically, so as to cause the air or other pressure to act alternately in each of the two vessels A B, the other vessel communicating with the atmosphere.

The device constituting this invention consists in the addition to the apparatus just described of a closed vessel D, into which the dyestuff to replenish the vessels A B is introduced by means of a funnel E, provided with a cock 2. Two pipes connect the vessel D with the top of the vessels A B, the said pipes passing through hermetically-tight joints provided in the cover of the vessel D and extending nearly to the bottom thereof. These pipes are provided with cocks 3 and 4, respectively, permitting of opening or closing it at will. Another pipe, also provided with a cock 1, connects the vessels D with one of the vessels A, B, C, or C'. In the accompanying drawing this pipe is shown connecting directly to the vessel C.

In order to introduce into the vessels A and B a quantity of new dyestuff, the cocks 2, 3, and 4 are closed and the cock 1 is opened, so as to allow a certain quantity of the dyestuff to flow into the vessel D from the vessel C. The cock 1 is then closed and the cock 2 opened and the dyestuff or mordant introduced through the funnel E into the vessel D. The cock 2 is then closed and the cocks 3 and 4 are opened, then compressed air coming from the vessel A or B, in which pressure is then existing, say the vessel A, forces the liquid contained in the vessel D toward the vessel B, whence it takes part again in the circulation through the apparatus and carries with it the whole or part of the dyestuff or mordant from the vessel D. The series of the successive pulsations of the apparatus supplies in a perceptibly equal manner to the vessel A and to the vessel B the dyestuff contained in the vessel D until the vessel D is entirely exhausted. The cocks 3 and 4 are then closed to isolate the vessel D, the apparatus being then in its normal working condition.

One of the two tubes running from the vessels A and B need not necessarily dip into the liquid contained in the vessel D. In this case the introduction of the additional dyestuff would take place only on one side of the apparatus. The apparatus could likewise be worked by deriving the pressure from any source of elastic fluid, such as a steam-generator, a compressed air or gas reservoir, or the like. The vessel D may be provided with a glass gage, so that the working of the apparatus can be readily seen.

Having now particularly described and ascertained the nature of this invention and in what manner the same is to be performed, I declare that what I claim is—

In a dyeing apparatus, a plurality of closed dye-tanks, a plurality of article-receiving tanks, pipes leading from the lower portions of the dye-tanks and having branches connected at separated points with the lower portions of the respective article-receiving tanks, a closed dye-reservoir communicating with a dye-tank, pipes extending through the top of the dye-reservoir and having their lower ends immersed in the dye in said reservoir, the upper ends of said pipes being connected with the tops of the closed dye-tanks, a connection between the upper portions of the dye-tanks, involving a four-way cock, and a valved funnel connected with the top of the dye-reservoir.

In testimony whereof I have hereunto set my hand in presence of two subscribing witnesses.

LÉON DÉTRÉ.

Witnesses:
   PAUL BLUM,
   HANSON C. COXE.